(12) United States Patent
Lan

(10) Patent No.: US 7,229,091 B2
(45) Date of Patent: Jun. 12, 2007

(54) AUTOMATICALLY UNFOLDABLE STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 232 days.

(21) Appl. No.: 11/145,919

(22) Filed: Jun. 7, 2005

(65) Prior Publication Data

US 2006/0273552 A1 Dec. 7, 2006

(51) Int. Cl.
 *B62B 7/06* (2006.01)
(52) U.S. Cl. ............ 280/642; 280/647; 280/650; 280/47.38
(58) Field of Classification Search ............ 280/642, 280/647, 650, 47.38, 38
See application file for complete search history.

(56) References Cited

U.S. PATENT DOCUMENTS

| 4,606,550 | A | * | 8/1986 | Cone | 280/642 |
| 4,892,327 | A | * | 1/1990 | Cabagnero | 280/650 |
| 5,669,624 | A | * | 9/1997 | Eichhorn | 280/642 |
| 5,921,574 | A | | 7/1999 | Driessen et al. | |
| 6,722,690 | B2 | | 4/2004 | Lan | |
| 6,896,286 | B2 | * | 5/2005 | Lin | 280/650 |
| 6,991,248 | B2 | * | 1/2006 | Valdez et al. | 280/647 |
| 7,017,922 | B2 | * | 3/2006 | Hartenstine et al. | 280/47.38 |
| 7,077,423 | B2 | * | 7/2006 | Hutchinson | 280/649 |
| 2003/0052474 | A1 | * | 3/2003 | Yang et al. | 280/642 |
| 2006/0066077 | A1 | * | 3/2006 | Espenshade et al. | 280/642 |

* cited by examiner

*Primary Examiner*—Christopher P. Ellis
*Assistant Examiner*—Katy Meyer
(74) *Attorney, Agent, or Firm*—Hunton & Williams LLP

(57) ABSTRACT

A stroller is convertible between an unfolded state and a folded state, and includes a handle frame disposed pivotally on a wheel frame and pivotable between an inclined position and a horizontal position. A brace member interconnects the handle frame and the wheel frame, and is convertible between a supporting state, where the handle frame is disposed at the inclined position and where the stroller is in the unfolded state, and a non-supporting state, where the handle frame is disposed at the horizontal position and is folded on the wheel frame and where the stroller is in the folded state. A retaining unit maintains the stroller in the folded state, and allows for a one-touch operation so as to permit the handle member to be biased by a biasing unit to the inclined position.

6 Claims, 11 Drawing Sheets

AUTOMATICALLY UNFOLDABLE STROLLER

BACKGROUND OF THE INVENTION

1. Field of the Invention

This invention relates to a stroller, and more particularly to a foldable stroller.

2. Description of the Related Art

Typically, to unfold a stroller after it is folded, the user needs to operate the stroller with both hands. This results in a troublesome unfolding process.

SUMMARY OF THE INVENTION

The object of this invention is to provide an automatically unfoldable stroller that can be unfolded conveniently and easily.

According to this invention, a stroller is convertible between an unfolded state and a folded state. The stroller includes:

a wheel frame;

a handle frame disposed pivotally on the wheel frame and pivotable on the wheel frame between an inclined position and a generally horizontal position;

a brace member interconnecting the handle frame and the wheel frame and convertible between a supporting state, where the handle frame is disposed at the inclined position and where the stroller is in the unfolded state, and a non-supporting state, where the handle frame is disposed at the horizontal position and is folded on the wheel frame and where the stroller is in the folded state;

a biasing unit including a torsional spring and a pressure cylinder, each of which interconnects the handle frame and the wheel frame so as to bias the handle frame to the inclined position; and a retaining unit maintaining the stroller in the folded state and allowing for one touch operation so as to permit the handle frame to be biased by the biasing unit to the inclined position.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
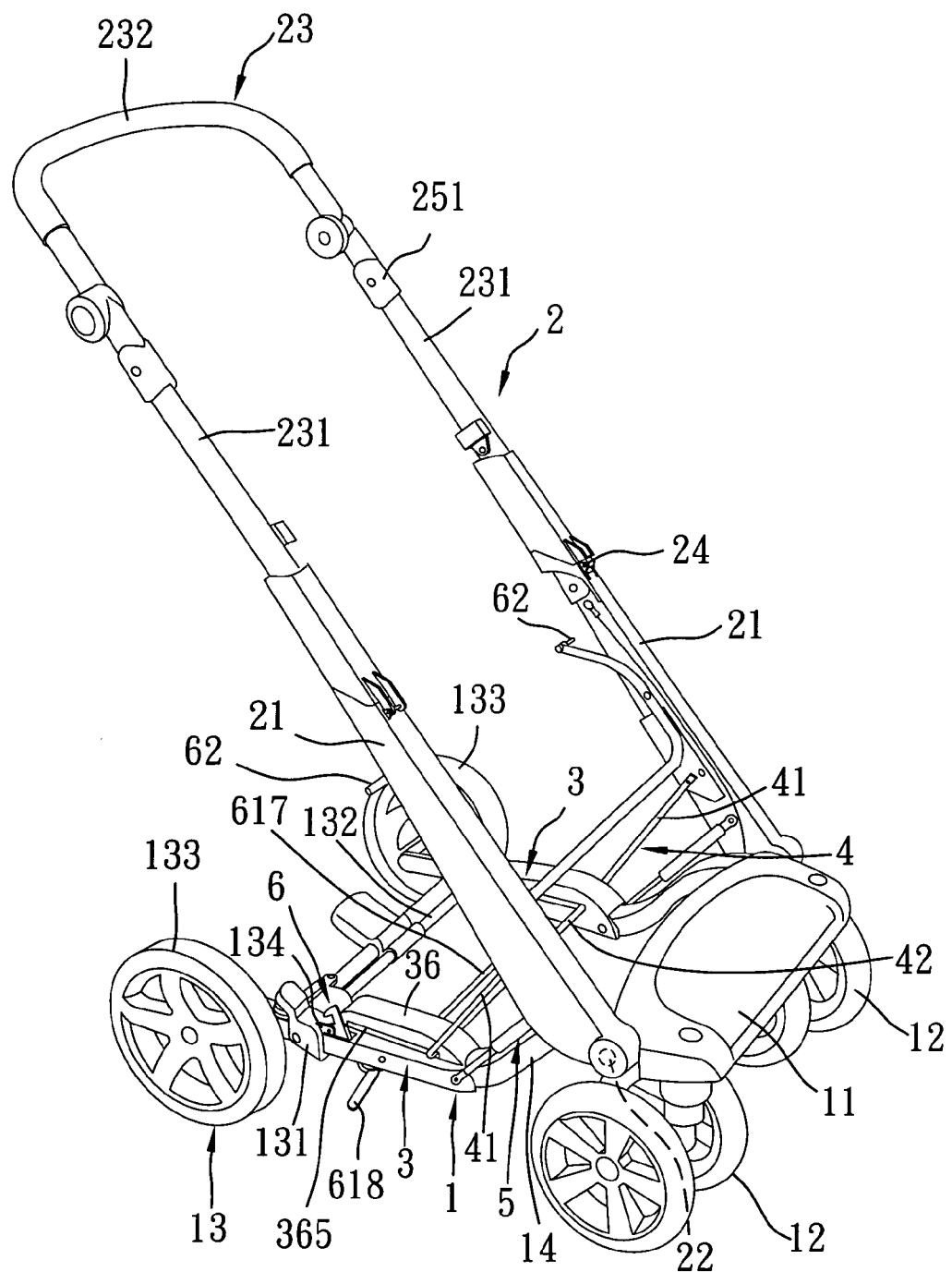
FIG. 1 is a perspective view of the preferred embodiment of an automatically unfoldable stroller according to this invention.
Figure 2:
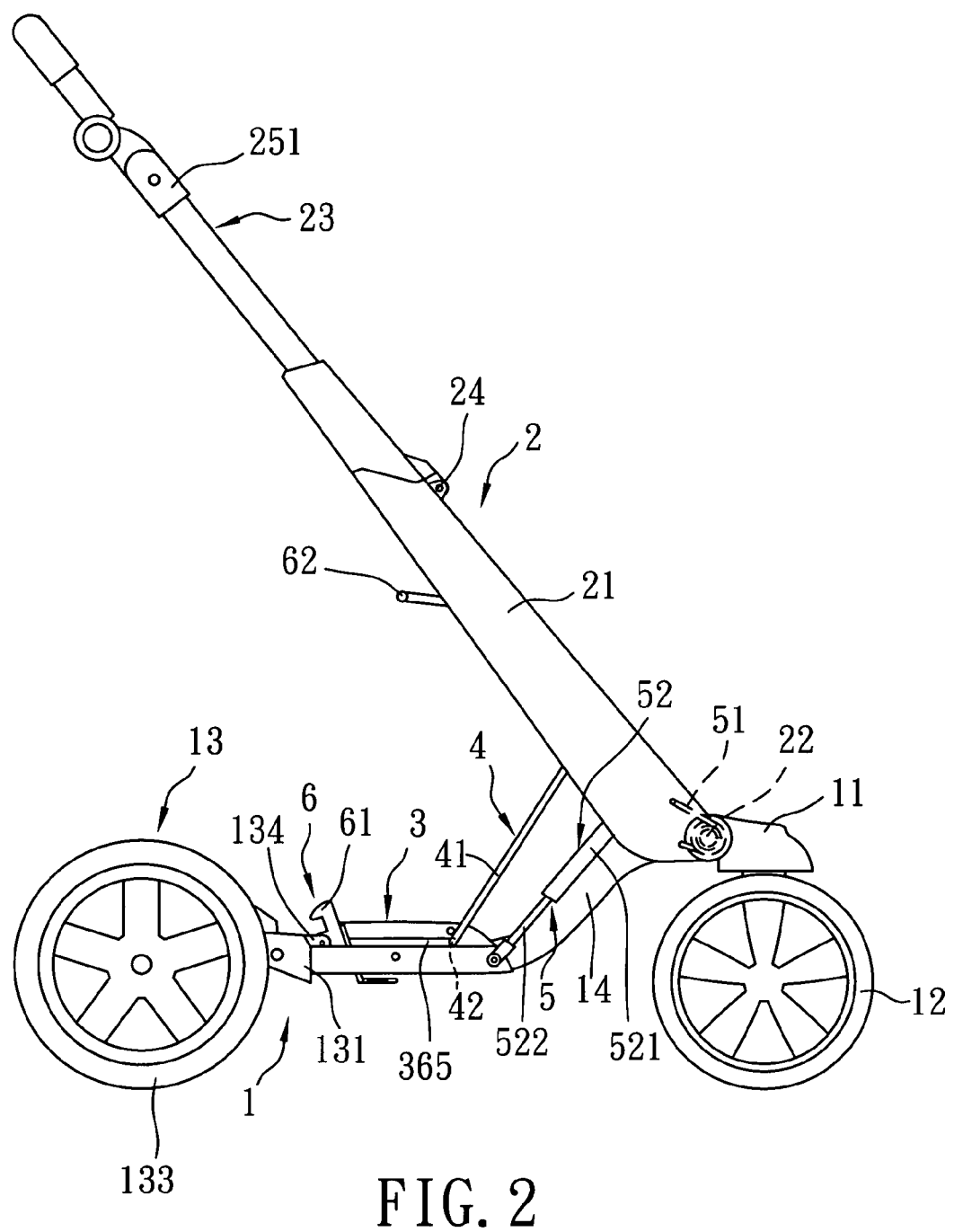
FIG. 2 is a side view of the preferred embodiment.
Figure 3:
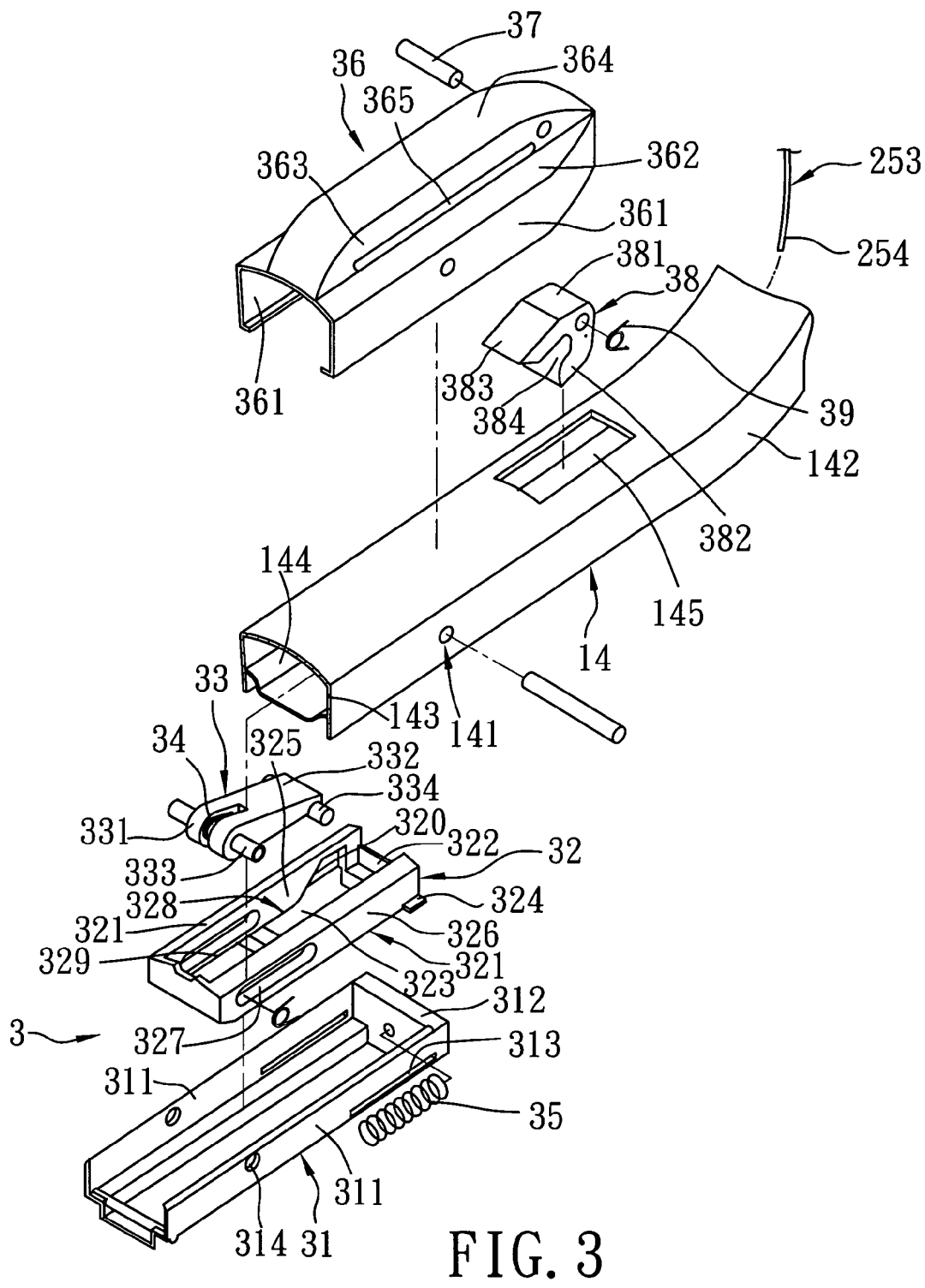
FIG. 3 is a fragmentary exploded perspective view of a brace-positioning unit of the preferred embodiment.

Referring to FIGS. 1, 2 and 3, the preferred embodiment of an automatically unfoldable stroller according to this invention includes a wheel frame 1, a handle frame 2, two brace-positioning units 3, a brace member 4, two biasing units 5 and a retaining unit 6. The stroller is convertible between an unfolded state shown in FIG. 2 and a folded state shown in FIG. 10.

The wheel frame 1 includes a front wheel seat 11 disposed at a front end portion thereof, two front wheel units 12, a rear wheel unit 13, and two mounting seats 14. The rear wheel unit 13 includes two rear wheel seats 131, a transverse connecting rod 132 interconnecting fixedly the rear wheel seats 131, and two rear wheel units 133 disposed respectively and rotatably on the rear wheel seats 131. Each of the rear wheel seats 131 is formed with a forwardly extending lug 134. Each of the mounting seats 14 is disposed between the front wheel seat 11 and the corresponding rear wheel seat 131. Each of the mounting seats 14 has a horizontal portion 141 and an inclined portion 142 extending frontwardly and upwardly from a front end of the horizontal portion 141. Each of the horizontal portions 141 has an annular wall 143 defining a passage 144 and being formed with an opening 145 at a top wall portion thereof.

Figure 4:
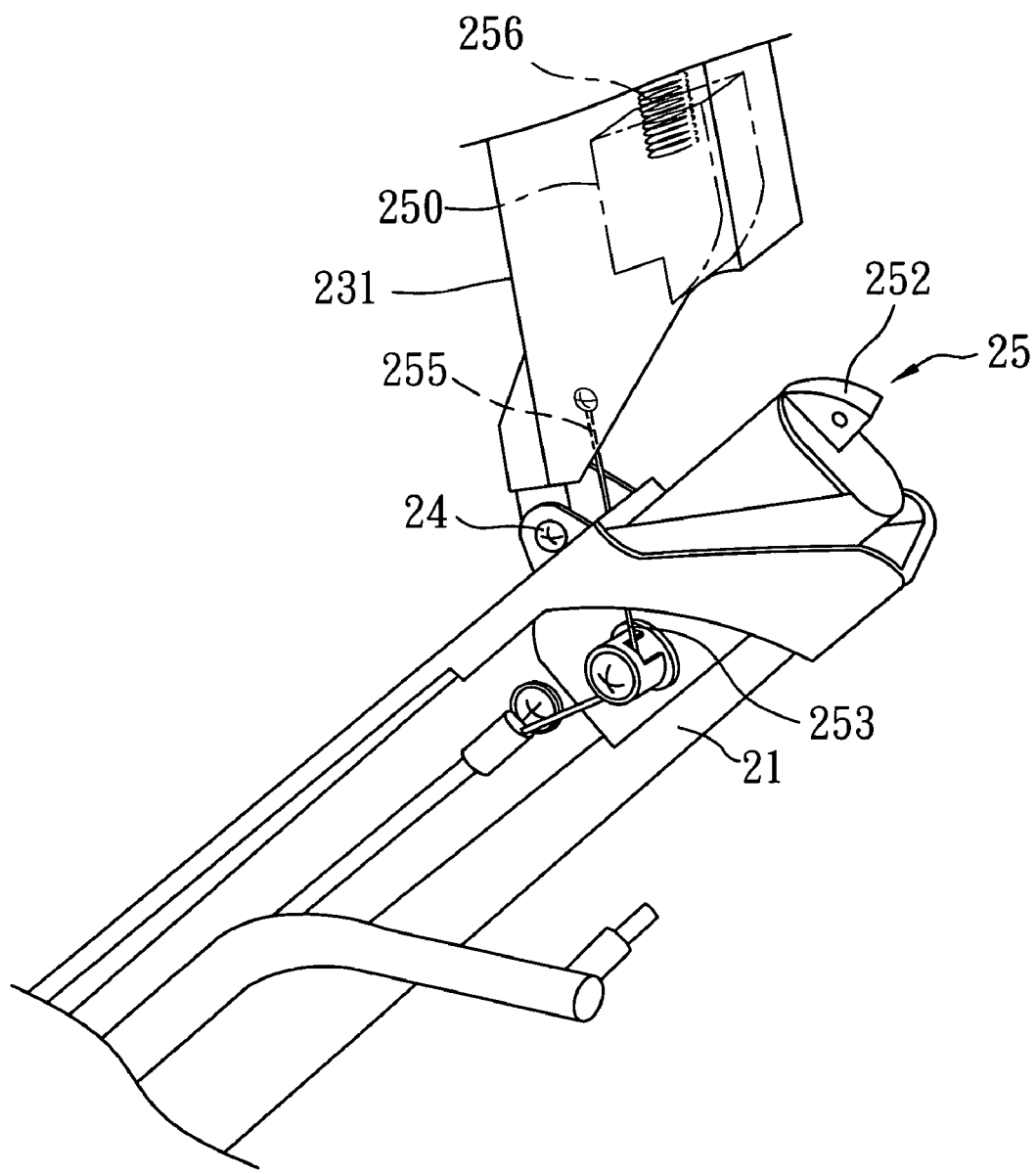
FIG. 4 is a fragmentary perspective view of the preferred embodiment, illustrating a locking unit.

Referring to FIGS. 1, 2, 3 and 4, the handle frame 2 includes a pair of swing rods 21, a first pivot shaft 22, a U-shaped handle rod 23, two second pivot shafts 24 and two locking units 25. The first pivot shaft 22 extends through the swing rods 21 and the front wheel seat 11 so as to allow for pivoting of the swing rods 21 on the wheel frame 1. The handle rod 23 is disposed above the swing rods 21, and has two end portions 231 and a grip portion 232 interconnecting the end portions 231. The second pivot shafts 24 extend respectively through the swing rods 21 and through the two end portions 231 of the handle rod 23. The locking units 25 lock the end portions 231 of the handle rod 23 respectively and releaseably on the swing rods 21. Each of the locking units 25 includes: a sliding block 250 disposed movably within the corresponding end portion 231; a sliding sleeve 251 sleeved movably on the corresponding end portion 231 of the handle rod 23 and connected to the sliding block 250 by a cable (not shown); a retaining block 252 disposed fixedly on the corresponding swing rod 21; a control cable 253 having a lower end 254 extending through the passage 144 in the corresponding mounting seat 14, and an upper end 255 fastened to the corresponding end portion 231 of the handle rod 23; and a coiled compression spring 256 biasing the sliding block 250 to engage the retaining block 252 so as to lock the corresponding end portion 231 on the corresponding swing rod 21. The detailed structures of the locking units 25 have been disclosed in U.S. Pat. No. 6,722,690, issued to the applicant. The sliding sleeve 251 of each of the locking units 25 can be pulled upwardly to remove the corresponding sliding block 250 from the corresponding retaining block 252 so as to allow for pivoting movement of the corresponding end portion 231 of the handle rod 23 relative to the corresponding swing rod 21, as shown in FIG. 4. When the end portions 231 of the handle rod 23 are turned to align with the swing rods 21, respectively, the sliding blocks 250 are biased to engage the retaining blocks 252.

Figure 5:
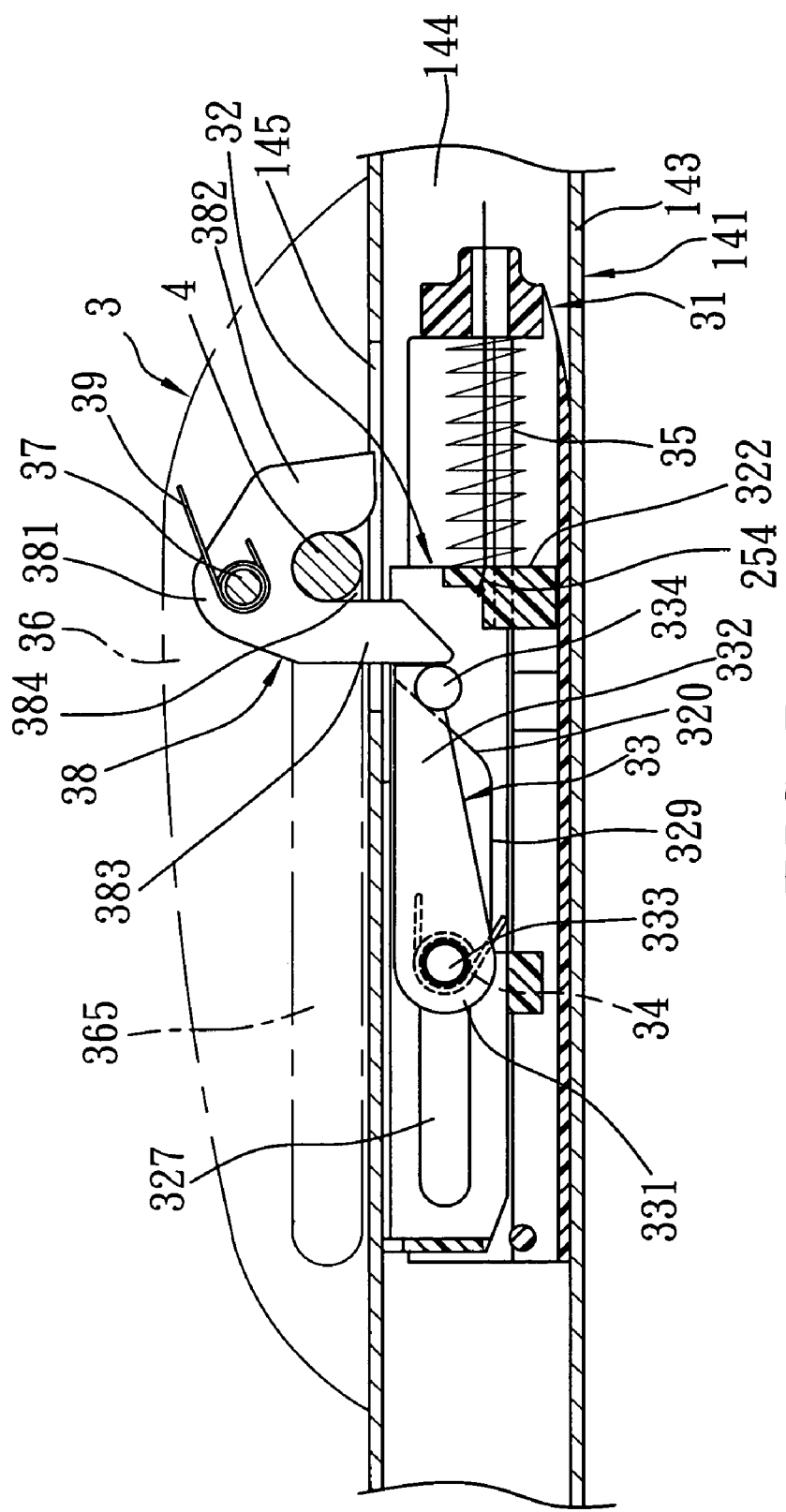
FIG. 5 is a fragmentary sectional view of the preferred embodiment, illustrating how a brace-positioning unit is in a positioning state.

Referring to FIGS. 1, 3 and 5, the brace-positioning units 3 are disposed respectively on the horizontal portions 141 of the mounting seats 14. Each of the brace-positioning units 3 includes a fixed seat 31 disposed fixedly within the horizontal portion 141 of the corresponding mounting seat 14, a sliding seat 32 movable between two sidewalls 311 of the fixed seat 31 to and fro along a longitudinal direction of the fixed seat 31, a retaining seat 33 disposed between two sidewalls 321 of the sliding seat 32, a torsional spring 34 for biasing the retaining seat 33 to rotate counterclockwise, a compression spring 35 disposed between a front end wall 312 of the fixed seat 31 and the sliding seat 32 and sleeved on the corresponding control cable 253 so as to bias the sliding seat 32 to move rearwardly, a cover seat 36 sleeved on the horizontal portion 141 of the corresponding mounting seat 14, a swing seat 38 disposed rotatably between two mounting walls 363 of the cover seat 36 by a third pivot shaft 37, and a torsional spring 39 sleeved on the third pivot shaft 37 so as to bias the swing seat 38 to rotate clockwise.

Each of the fixed seats 31 includes two longitudinal guide slots 313 formed respectively through front portions of the sidewalls 311, and two pivot holes 314 formed respectively through rear portions of the sidewalls 311.

Each of the sliding seats 32 includes a front end wall 322 connected fixedly to the lower end 254 of the corresponding control cable 253, a mounting space 323 defined between the sidewalls 321, and two sliding plates 324 extending respectively and outwardly from the sidewalls 321 and disposed respectively and movably within the guide slots 313. Each of the sidewalls 321 has an inner surface 325, an outer surface 326, and a slide slot 327 aligned with the corresponding pivot hole 314. Each of the inner surfaces 325 is formed with a guiding projection 328 that has a rod-releasing bottom edge 329 and a rod-retaining front edge 320 extending forwardly and upwardly from a front end of the bottom edge 329.

Each of the retaining seats 33 has a rear pivot end 331 and a front free end 332. Each of the pivot ends 331 includes two integral pivot pins 333. Each of the pivot pins 333 extends through the corresponding slide slot 327, and is disposed rotatably within the corresponding pivot hole 314. Each of the free ends 332 includes two integral positioning rods 334 disposed respectively under the corresponding projections 328.

The torsional springs 34 are sleeved respectively on the pivot pins 333, and bias the positioning rods 334 respectively to abut against the projections 328.

Each of the cover seats 36 further has two horizontal walls 362 extending respectively and outwardly from lower ends of the mounting walls 363, two sidewalls 361 extending respectively and downwardly from outer sides of the horizontal walls 362, and a top wall 364 interconnecting top ends of the mounting walls 363. Each of the mounting walls 363 is formed with a longitudinal limiting slot 365. Each of the third pivot shafts 37 extends through a pivot portion 381 of the corresponding swing seat 38 and the corresponding mounting wall 363 at a position in front of the corresponding limiting slot 365. The torsional springs 39 are sleeved respectively on the third pivot shafts 37. Each of the swing seats 38 is U-shaped, and further has a pushed portion 382, an abutment portion 383 and a retaining groove 384 defined between the pushed portion 382 and the abutment portion 383.

Figure 6:
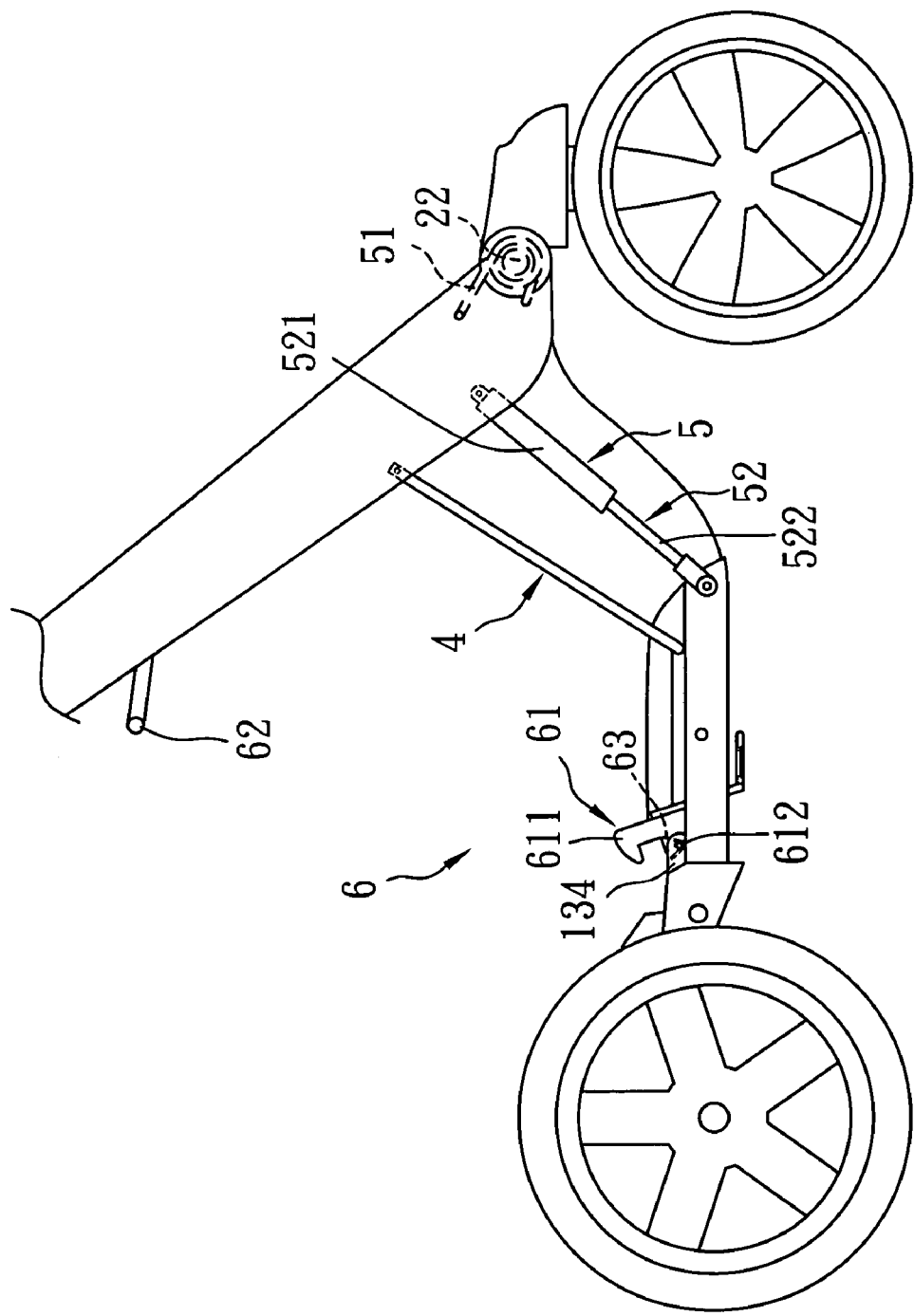
FIG. 6 is a fragmentary sectional view of the preferred embodiment, illustrating a retaining unit.
Figure 7:
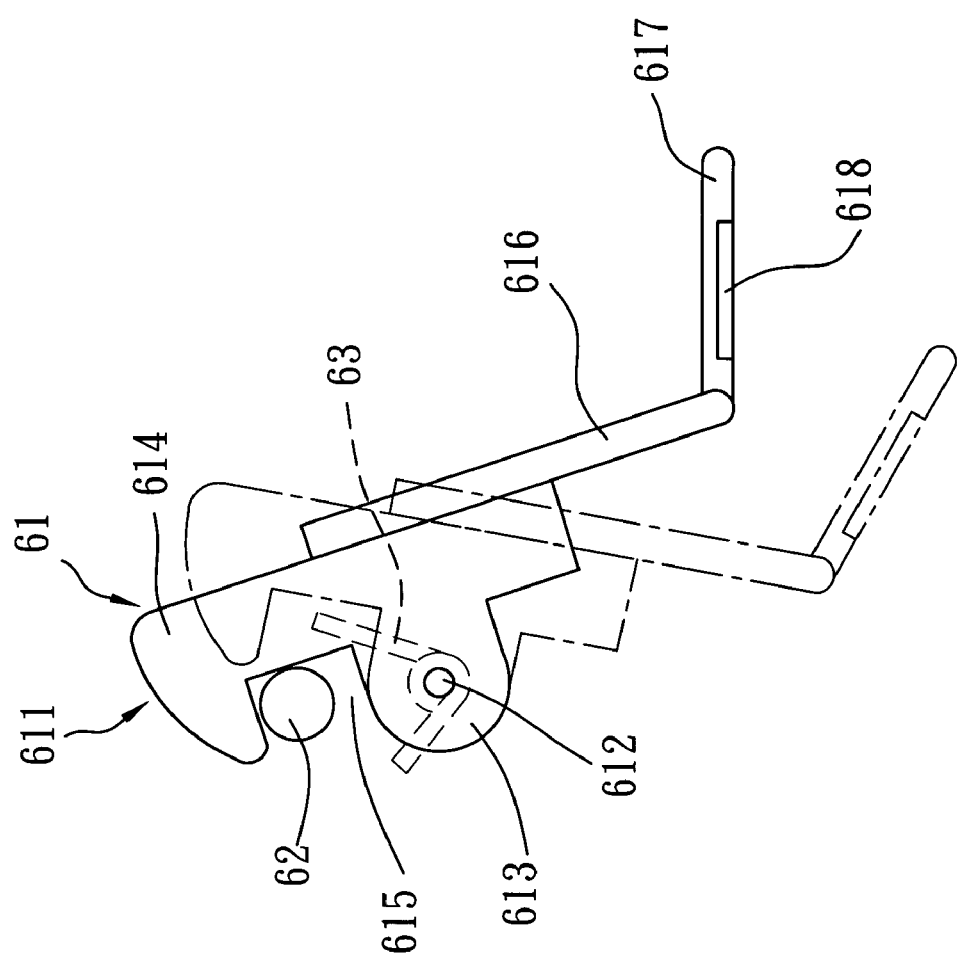
FIG. 7 is a schematic side view of a retaining unit of the preferred embodiment, illustrating rotation of a retaining member relative to a retaining rod.
Figure 10:
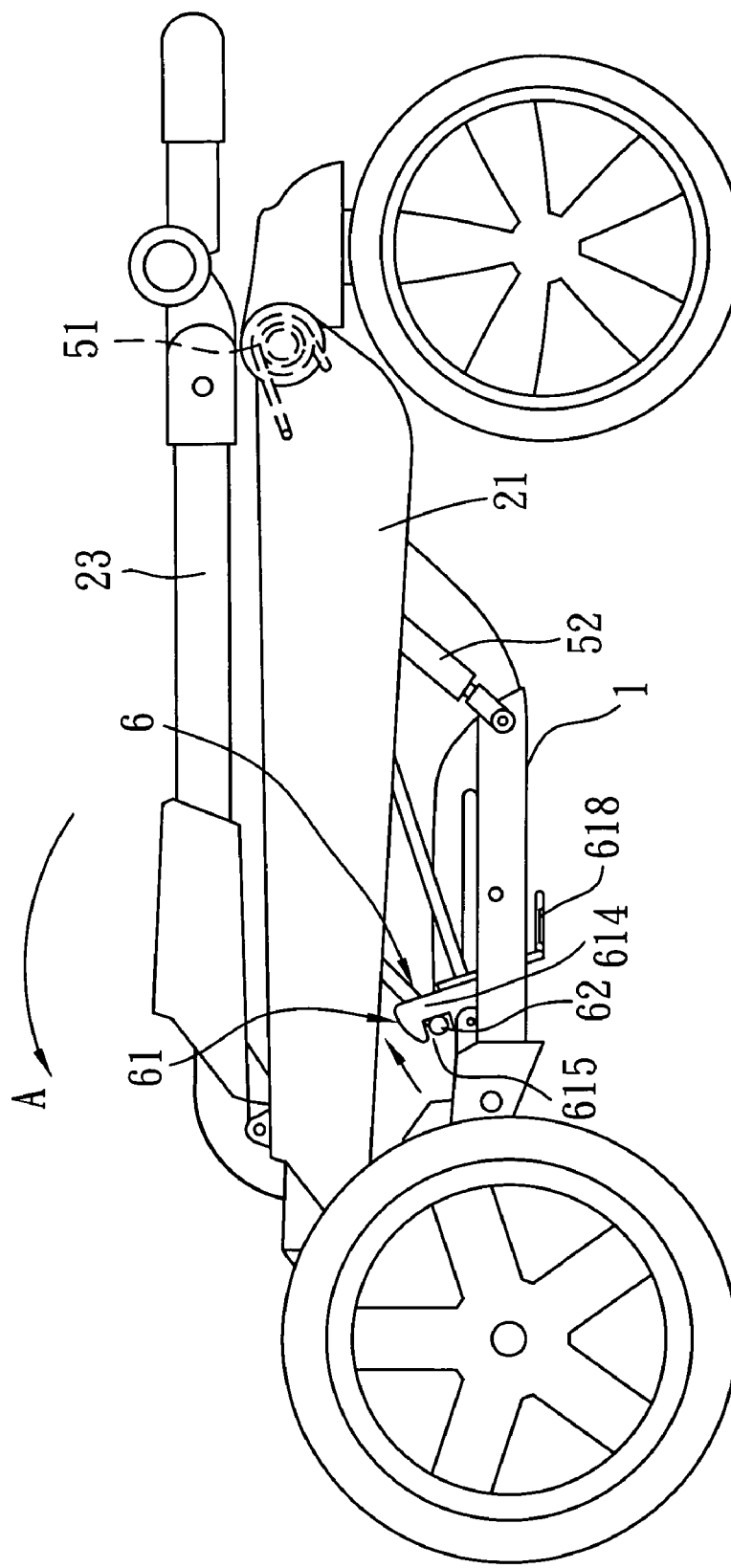
FIG. 10 is a sectional view of the preferred embodiment, illustrating the folded state of the stroller.

Referring to FIGS. 1, 6 and 7, the brace member 4 interconnects the wheel frame 1 and the handle frame 2, and is convertible between a supporting state shown in FIG. 2 and a non-supporting state shown in FIG. 10. When the brace member 4 is in the supporting state, the handle frame 2 is disposed at an inclined position, and the stroller is in the unfolded state. When the brace member 4 is in the non-supporting state, the handle frame 2 is disposed at a generally horizontal position, and the stroller is in the folded state. The brace member 4 includes two supporting rods 41 and a connecting rod 42. When the handle frame 2 is disposed at the inclined position, the support rods 41 are also inclined. The connecting rod 42 interconnects fixedly lower ends of the supporting rods 41. The supporting rods 41 have upper ends connected respectively and pivotally to the swing rods 21 of the handle frame 2. The connecting rod 42 extends through the limiting slots 365 in the cover seats 36, and is confined within the retaining grooves 384 in the swing seats 38 when the stroller is in the unfolded state, as shown in FIG. 5.

Each of the biasing units 5 includes a torsional spring 51 and a pressure cylinder 52, each of which interconnects the wheel frame 1 and the handle frame 2 so as to bias the handle frame 2 to the inclined position. The torsional springs 51 are sleeved respectively on the first pivot shafts 22. Each of the pressure cylinders 52 includes a cylinder body 521 connected pivotally to the corresponding swing rod 21, and a piston rod 522 connected pivotally to the corresponding mounting seat 14.

The retaining unit 6 maintains the stroller in the folded state, and includes two retaining members 61, two retaining rods 62 and two torsional springs 63. Each of the retaining members 61 has a plate body 611. Two fourth pivot shafts 612 extend respectively through pivot portions 613 of the plate bodies 611. Each of the retaining members 61 further has a retaining portion 614 that is formed with a retaining groove 615, and a driving portion 616. A transverse rod 617 interconnects fixedly the driving portions 616, and is formed with an integral horizontal pedal lever 618 that extends out of the corresponding mounting seat 14. The retaining rods 62 are connected respectively and fixedly to the swing rods 21. When the stroller is in the folded state, the retaining members 61 are biased to engage the retaining rods 62 such that the retaining rods 62 are disposed respectively within the retaining grooves 615 in the retaining members 61.

Referring to FIGS. 2, 3 and 5, when the stroller is in the unfolded state, the connecting rod 42 engages the retaining grooves 384 in the swing seats 38, as described above, and the free ends 332 of the retaining seats 33 are biased by the torsional springs 34 to press against the abutment portions 383 of the swing seats 38. On the other hand, the retaining members 61 are removed from the retaining rods 62.

Figure 8:
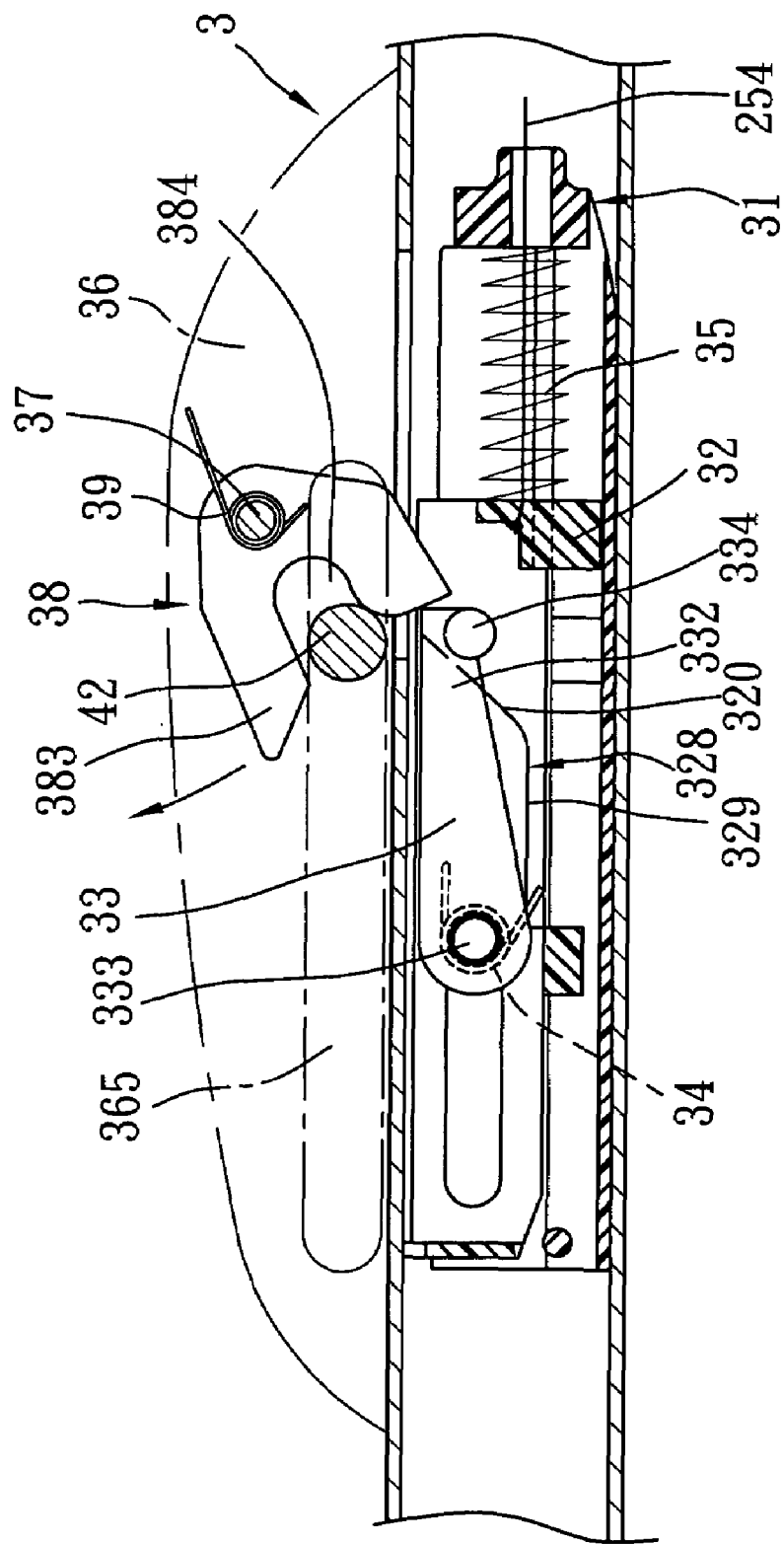
FIG. 8 is a fragmentary sectional view of the preferred embodiment, illustrating how the brace-positioning unit is in a non-positioning state.
Figure 9:
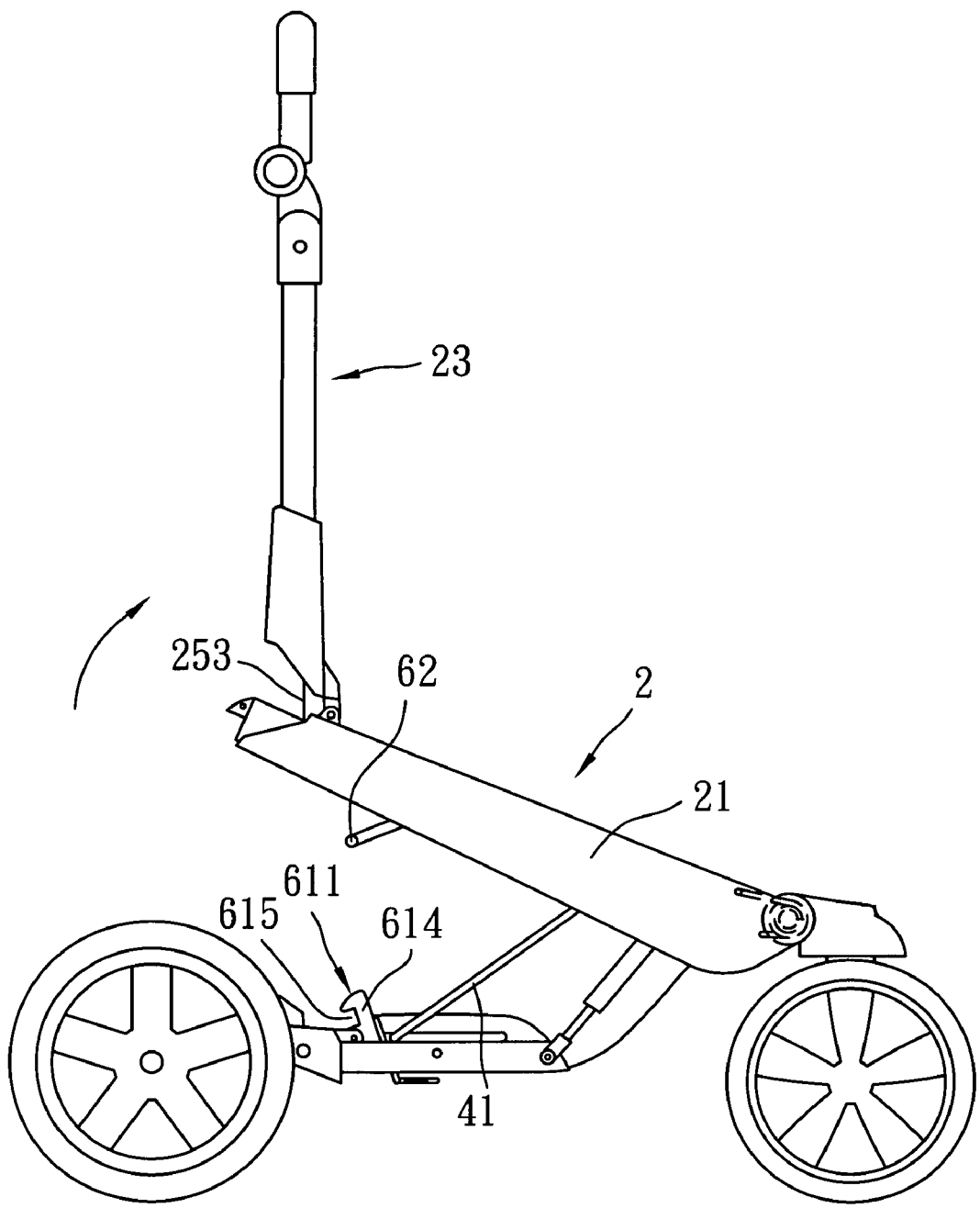
FIG. 9 is a sectional view of the preferred embodiment, illustrating how the stroller is converted from an unfolded state to a folded state.

Referring to FIGS. 2, 4 and 8, when it is desired to fold the stroller, the sliding sleeves 251 are moved upwardly on the handle rod 23 to remove the sliding blocks 250 from the retaining blocks 252. Subsequently, the handle rod 23 is pivoted forward about the second pivot shafts 24, as shown in FIG. 9. Because the upper ends 255 of the control cables 253 are fastened to the handle rod 23 and because the lower ends 254 of the control cables 253 are fastened respectively to the sliding seats 32, when the handle rod 23 pivots forwardly, the control cables 253 pull the sliding seats 32 forwardly within the fixed seats 31 against the biasing action of the compression springs 35. Hence, the positioning rods 334 move rearwardly from the front edges 320 of the projections 328 onto the bottom edges 329 of the projections 328. This results in downward pivoting movement of the retaining seats 33 about the pivot pins 333 and, therefore, removal of the free ends 332 of the retaining seats 33 from the abutment portions 383 of the swing seats 38. When the retaining seats 33 separate from the swing seats 38, the swing seats 38 rotate clockwise about the third pivot shafts 37 so as to release the connecting rod 42 of the brace member 4 therefrom, as shown in FIG. 8. At this time, when the handle rod 23 is released, the connecting rod 42 moves rearwardly along each of the limiting slots 365 from the position shown by the solid lines in FIG. 11 to the position shown by the phantom lines in FIG. 11 resulting from displacement of the handle frame 2 by virtue of gravity. On the other hand, the handle frame 2 simultaneously also pivots downward about the first pivot shafts 22. Referring to FIGS. 7, 9 and 10, each of the retaining rods 62 contact and push the corresponding retaining member 61 from the position shown by the solid lines in FIG. 7 to the position shown by the phantom lines in FIG. 7 during downward pivoting movement of the handle frame 2. When the handle frame 2 arrives at the generally horizontal position and therefore is folded on the wheel frame 1, the retaining rods 62 are disposed at the positions shown in FIG. 7. At this time, because no pushing force is applied to the retaining members 61 by the retaining rods 62, each of the retaining members 61 is biased by the corresponding torsional spring 63 to return to the position shown by the solid lines shown in FIG. 7. As such, the retaining rods 62 engage the retaining grooves 615 in the retaining members 61, thereby preventing rotation of the handle frame 2 relative to the wheel frame 1. That is, the stroller is maintained in the folded state shown in FIG. 10 by the retaining unit 6.

When the stroller is in the folded state, a two-step unfolding process can be performed that includes a hand-operated step and a foot-operated step. The hand-operated step involves pivoting the handle rod 23 rearwardly relative to the swing rods 21 in a direction (A) (see FIG. 10) to align the handle rod 23 with the swing rods 21. The foot-operated step involves stepping on the pedal lever 618 against the biasing action of the torsional springs 63 so as to remove the retaining members 61 from the retaining rods 62. Hence, the torsional spring 51 cooperates with the pressure cylinder 52 to bias the handle rod 23 of the handle frame 2 to pivot away from the wheel frame 1. As a result, the handle frame 2 turns to the inclined position.

Figure 11:
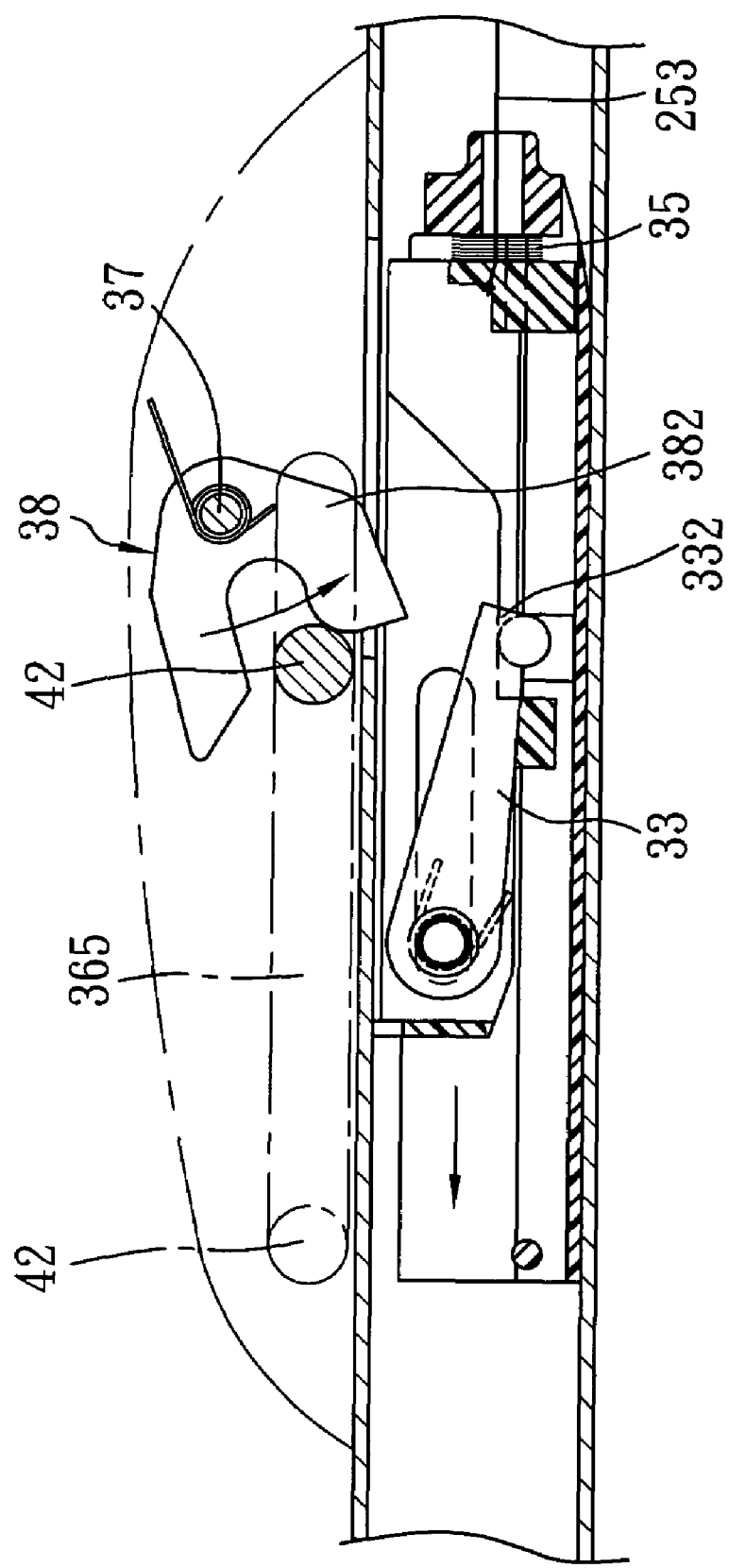
FIG. 11 is a fragmentary sectional view of the preferred embodiment, illustrating how the brace-positioning unit is converted into a non-positioning state.

Referring to FIGS. 5, 9 and 11, during unfolding of the stroller, the upper ends of the supporting rods 41 move with the swing rods 21. Hence, the connecting rod 42 moves forwardly within the limiting slots 365, and therefore pushes the swing seats 38 to rotate counterclockwise to the position shown in FIG. 5. On the other hand, when the handle rod 23 is aligned with the swing rods 21, slack is provided in the control cables 253, and the compression springs 35 move the sliding seats 32 rearwardly. Hence, the retaining seats 33 are biased by the torsional springs 34 to press against the abutment portions 383 of the swing seats 38, as shown in FIG. 5. As a result, the brace member 4 is maintained in the supporting state.

An advantage of the stroller of this invention is that, after the handle frame 2 is unfolded, a one-touch operation (i.e., a stepping-on operation) performed on the retaining unit 6 with one foot is enough to automatically unfold the stroller.

With this invention thus explained, it is apparent that numerous modifications and variations can be made without departing from the scope and spirit of this invention. It is therefore intended that this invention be limited only as indicated by the appended claims.

I claim:

1. A stroller convertible between an unfolded state and a folded state, said stroller comprising:
   a wheel frame;
   a handle frame disposed pivotally on said wheel frame and pivotable on said wheel frame between an inclined position and a generally horizontal position;
   a brace member interconnecting said handle frame and said wheel frame and convertible between a supporting state, where said handle frame is disposed at said inclined position and where said stroller is in said unfolded state, and a non-supporting state, where said handle frame is disposed at said horizontal position and is folded on said wheel frame and where said stroller is in said folded state;
   a biasing unit including a torsional spring and a pressure cylinder, each of which interconnects said handle frame and said wheel frame so as to bias said handle frame to said inclined position; and
   a retaining unit maintaining said stroller in said folded state and allowing for one touch operation so as to permit said handle frame to be biased by said biasing unit to said inclined position.

2. The stroller as claimed in claim 1, wherein said retaining unit includes a retaining member disposed pivotally on said wheel frame and having a retaining groove, and a retaining rod attached to said handle frame and confined within said retaining groove in said retaining member so as to prevent rotation of said handle frame relative to said wheel frame when said stroller is in said folded state.

3. The stroller as claimed in claim 2, wherein said retaining rod is connected fixedly to said handle frame, said retaining unit further including a torsional spring for biasing said retaining member to rotate on said wheel frame in a direction so as to engage said retaining rod within said retaining groove in said retaining member when said stroller is in said folded state.

4. The stroller as claimed in claim 3, wherein said retaining member includes an integral horizontal pedal lever that allows for a stepping-on operation against biasing action of said torsional spring of said retaining unit so as to remove said retaining member from said retaining rod, thereby permitting said handle frame to be biased by said biasing unit to said inclined position, said stepping-on operation constituting said one-touch operation.

5. The stroller as claimed in claim 1, further comprising a brace-positioning unit convertible between a positioning state, where said handle frame is maintained at said inclined position, and a non-positioning state, where said handle frame is foldable on said wheel frame, said brace-positioning unit being biased to said positioning state.

6. The stroller as claimed in claim 1, wherein said handle frame includes:
   a pair of swing rods that are inclined when said handle frame is disposed at said inclined position;
   a first pivot shaft connecting said swing rods rotatably to a front end portion of said wheel frame;
   a U-shaped handle rod disposed above said swing rods;
   two second pivot shafts extending respectively through two end portions of said handle rod and through said swing rods so as to connect said handle rod rotatably to said swing rods, said handle rod being foldable on said swing rods and being unfoldable from said swing rods so as to align with said swing rods; and
   two locking units for locking said end portions of said handle rod respectively and releaseably on said swing rods, each of said locking units including a control cable operable to change said brace-positioning unit from said positioning state to said non-positioning state.

* * * * *